United States Patent
Drezek et al.

(10) Patent No.: US 10,641,171 B2
(45) Date of Patent: May 5, 2020

(54) COMPRESSOR DISCHARGE SYSTEM

(71) Applicant: General Electric Company, Schenectady, NY (US)

(72) Inventors: Przemyslaw Sebastian Drezek, Warsaw (PL); Michael Anthony Acosta, Baytown, TX (US); Victor Gerardo Cabal-Velarde, Queretaro (MX); Richard Michael Watkins, Spring, TX (US); David Garza-Maldonado, Queretaro (MX)

(73) Assignee: General Electric Company, Schenectady, NY (US)

( * ) Notice: Subject to any disclaimer, the term of this patent is extended or adjusted under 35 U.S.C. 154(b) by 343 days.

(21) Appl. No.: 15/585,010

(22) Filed: May 2, 2017

(65) Prior Publication Data

US 2018/0291806 A1    Oct. 11, 2018

(30) Foreign Application Priority Data

Apr. 10, 2017   (PL) .......................................... 421253

(51) Int. Cl.
| | | |
|---|---|---|
| *F02C 6/08* | (2006.01) | |
| *F02C 9/18* | (2006.01) | |
| *F02C 9/52* | (2006.01) | |
| *F02C 7/32* | (2006.01) | |
| *F02C 9/24* | (2006.01) | |

(52) U.S. Cl.
CPC .................. *F02C 6/08* (2013.01); *F02C 7/32* (2013.01); *F02C 9/18* (2013.01); *F02C 9/52* (2013.01); *F02C 9/24* (2013.01)

(58) Field of Classification Search
CPC ...... F02C 6/08; F02C 7/20; F02C 7/32; F02C 9/18; F02C 9/52; F02C 9/24
See application file for complete search history.

(56) References Cited

U.S. PATENT DOCUMENTS

| | | | |
|---|---|---|---|
| 6,442,941 B1 | 9/2002 | Anand et al. | |
| 6,543,234 B2 | 4/2003 | Anand et al. | |
| 9,347,380 B2 | 5/2016 | Ponnuraj et al. | |
| 2005/0257514 A1 | 11/2005 | Morgan et al. | |
| 2009/0320496 A1* | 12/2009 | Faulder ................. | F01D 25/305 60/785 |
| 2010/0232935 A1* | 9/2010 | Twell ................... | F01D 17/162 415/151 |

(Continued)

FOREIGN PATENT DOCUMENTS

| | | |
|---|---|---|
| EP | 1 795 708 A2 | 6/2007 |
| EP | 2 610 441 A2 | 7/2013 |
| RU | 2 490 508 C1 | 8/2013 |

OTHER PUBLICATIONS

Search Report issued in connection with corresponding PL Application No. P.421253 dated Nov. 3, 2017.

*Primary Examiner* — Steven M Sutherland
(74) *Attorney, Agent, or Firm* — Fletcher Yoder, P.C.

(57) ABSTRACT

A system includes a bleed system that directs a bleed flow form a high pressure region to a low pressure region. The bleed system includes a bleed conduit that includes an inlet coupled to the high pressure region. The bleed system also includes an outlet that provides the bleed flow into the low pressure region. The bleed conduit it slideably coupled to a housing that defines the low pressure region.

22 Claims, 7 Drawing Sheets

(56) References Cited

U.S. PATENT DOCUMENTS

2014/0182307 A1* 7/2014 Ponnuraj .................. F02C 9/18
  60/785
2016/0090859 A1* 3/2016 Aggas .................. F01D 25/002
  134/22.18

* cited by examiner

COMPRESSOR DISCHARGE SYSTEM

CROSS-REFERENCE TO RELATED APPLICATIONS

This application claims priority from and the benefit of Polish Patent Application Serial No. PL421253, entitled "COMPRESSOR DISCHARGE SYSTEM," filed Apr. 10, 2017, which is hereby incorporated by reference in its entirety for all purposes.

BACKGROUND

The subject matter disclosed herein relates to gas turbine engines, such as a system for expanding a compressor bleed flow.

Gas turbine systems generally include a compressor, a combustor, and a turbine. The combustor combusts a mixture of compressed air and fuel to produce hot combustion gases directed to the turbine to produce work, such as to drive an electrical generator. The compressor compresses air from an air intake, and subsequently directs the compressed air to the combustor. However, some of the compressed air may not be directed to the combustor at all times, but rather may be directed from the compressor to the other parts of the gas turbine system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a bleed system that directs a bleed flow from a high pressure region to a low pressure region. The bleed system includes a bleed conduit that includes an inlet coupled to the high pressure region. The bleed system also includes an outlet that provides the bleed flow into the low pressure region. The bleed conduit is slideably coupled to a housing that defines the low pressure region.

In a second embodiment, a system includes a bleed system that directs a bleed flow from a high pressure region to a low pressure region. The bleed system includes a bleed conduit that includes an inlet coupled to the high pressure region. The bleed conduit also includes an outlet positioned within the low pressure region. A portion of a sidewall of the bleed conduit that is positioned within the low pressure region includes one or more openings that enable the bleed flow to pass from the bleed conduit into the low pressure region.

In a third embodiment, a system includes a gas turbine engine. The gas turbine engine includes a compressor that produces a bleed flow, a gas turbine coupled to the compressor, an exhaust section that receives an exhaust flow and the bleed flow, and a bleed system that directs the bleed flow from the compressor to the exhaust section. The bleed system includes a bleed conduit that includes an inlet coupled to the compressor and an outlet position within the exhaust section. The bleed conduit is slideably coupled to the exhaust section.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A variety of systems, such as compressors, pumps, turbines, and various turbomachines may use a bleed system to bleed a fluid from one location to another. The bleed system may receive a bleed flow from a high pressure region and direct the bleed flow to a low pressure region. A staged bleed conduit of the bleed system is configured to gradually depressurize the bleed flow to reduce the vibration and/or noise of the bleed system, such as vibration of a bleed valve. The staged bleed conduit may have at least two stages to gradually (e.g., incrementally) depressurize the bleed flow. Each stage of the staged bleed conduit may have an expansion section and/or a diffuser plate. The number of stages may be determined at least in part on the difference in pressure between the high pressure region and the low pressure region. More stages may be used for large pressure differences than for small pressure differences. The expansion sections increase the dimension of the staged bleed conduit to at least reduce the static pressure of the bleed flow. The diffuser plates partially obstruct the bleed flow and permit passage of the bleed flow through orifices. The diffuser plates are configured to at least reduce the kinetic energy or dynamic pressure of the bleed flow. The characteristics of the expansion sections (e.g., expansion percentage, size, cross-sectional shape, length) and diffuser plates (e.g., orifice size, orifice quantity, orifice shape, orifice configuration, diffuser plate size) affect the vibration of the bleed system. Vibration and thermal expansion of the bleed section may cause the bleed section to move. Certain mounting and coupling features may be utilized to accommodate the movements of the bleed system.

Figure 1:
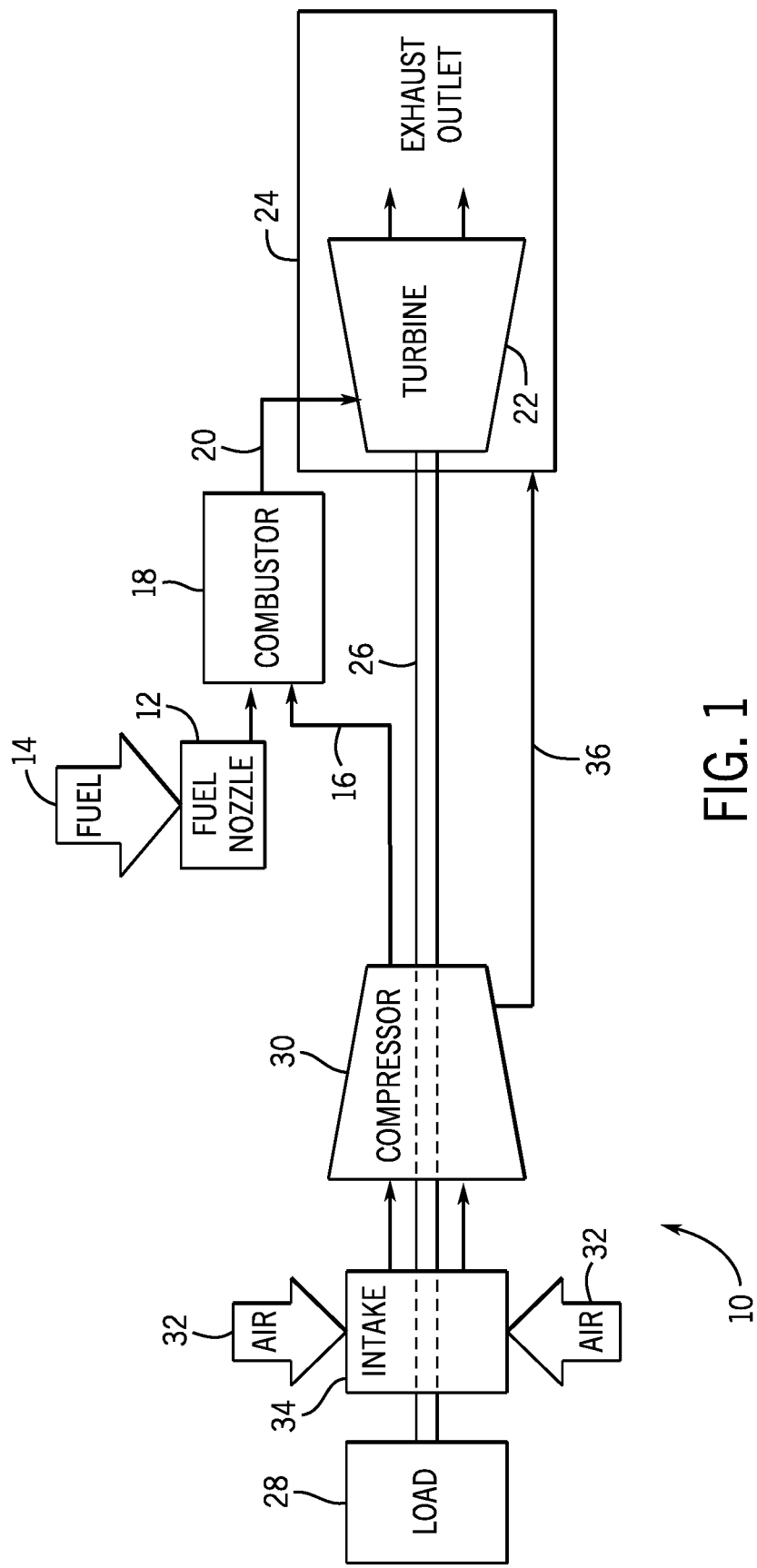
FIG. 1 is a schematic block diagram of an embodiment of a gas turbine system having a bleed system.

Turning now to the drawings and referring first to FIG. 1, a block diagram of an embodiment of a gas turbine system 10 is illustrated. As described in detail below, the disclosed gas turbine system 10 (e.g., a gas turbine engine) may employ one or more fuel nozzles 12 to mix a fuel 14 with compressed air 16. The gas turbine system 10 may use liquid or gas fuel 14, such as natural gas and/or a hydrogen rich synthetic gas, to drive the gas turbine system 10. As depicted, the one or more fuel nozzles 12 intake the fuel 14, mix the fuel 14 with compressed air 16, and distribute the air-fuel mixture into a combustor 18 in a suitable ratio for optimal combustion, emissions, fuel consumption, and power output. The air-fuel mixture combusts within the combustor 18, thereby creating hot pressurized exhaust gases 20. The combustor 18 directs the exhaust gases 20 through a turbine 22 toward an exhaust section 24. As the exhaust gases 20 pass through the turbine 22, the exhaust gases 20 force turbine blades to rotate a shaft 26 along an axis of the gas turbine system 10. As illustrated, the shaft 26 may be connected to various components of the gas turbine system 10, including a load 28. The load 28 may be a part of a vehicle or a stationary load, such as a propeller on an aircraft or an electrical generator in a power plant, for example. The load 28 may include any suitable device capable of being powered by the rotational output of the gas turbine system 10. The shaft 26 may also be connected to the compressor 30. The compressor 30 also includes blades coupled to the shaft 26. As the shaft 26 rotates, the blades within the compressor 30 also rotate, thereby compressing air 32 from an air intake 34 through the compressor 30 and into the fuel nozzles 12 and/or combustor 18. As described in detail below, some of the compressed air 16 may be bled through a bleed system 36 (e.g., compressor discharge system) as a bleed flow for various purposes. The bleed flow may be directed through the bleed system 36 to release excess pressure produced by the compressor 30, to protect the combustor 18 and/or turbine 22 from surge or stall conditions, to cool the exhaust gases 20 and/or turbine 22, to dilute or entrain the exhaust gases 20 through the exhaust section 24, and so forth.

Figure 2:
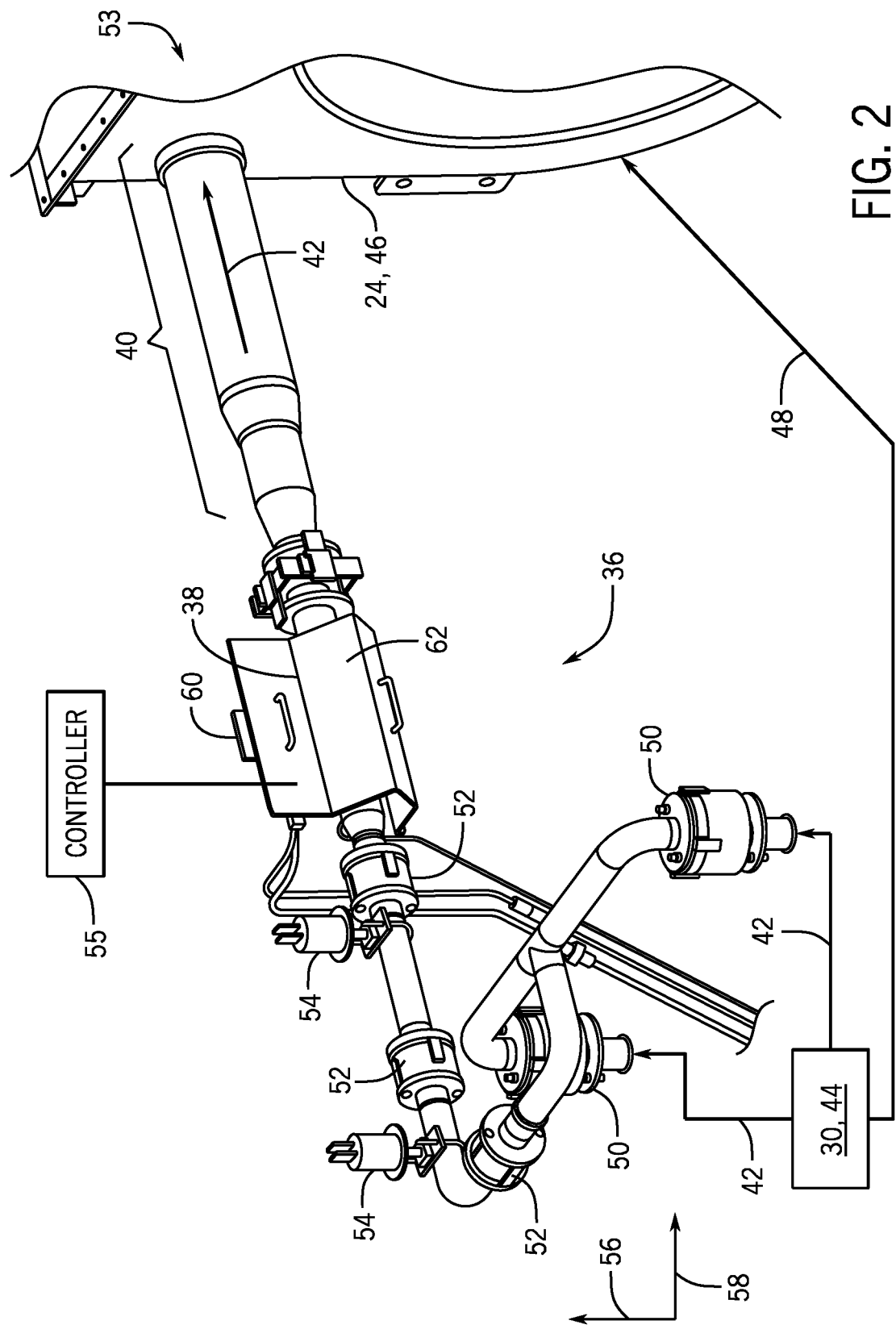
FIG. 2 is a perspective view of an embodiment of the bleed system that may be used in the gas turbine system of FIG. 1.

FIG. 2 illustrates an embodiment of the bleed system 36. The bleed system 36 includes a valve 38 (e.g., a bleed control valve) and a staged bleed conduit 40. The bleed system 36 is configured to direct a bleed flow 42 from a high pressure region 44 (e.g., compressor 30) to a low pressure region 46 (e.g., exhaust section 24). The bleed flow 42 is a portion (e.g., less than approximately 5, 10, 15, 20, or 25 percent) of a main flow 48. For example, the main flow 48 may be the compressed air 16 from the compressor 30, and the bleed flow 42 may be a diverted portion of the main flow 48. The bleed system 36 receives the bleed flow 42 at one or more inlets 50. The one or more inlets 50 may be coupled directly to the compressor 30 and may include 1, 2, 3, 4, 5, 6, or more inlets. The valve 38 is configured to open to enable the bleed flow 42 to pass from the one or more inlets 50 through the staged bleed conduit 40 to an outlet section 53. The outlet section 53 is configured to direct the bleed flow 42 into the low pressure region 46. The exhaust section 24 may be configured to direct the bleed flow 42 for a number of uses such as to dilute and entrain exhaust gases or to cool turbine blades.

As previously discussed, the bleed system 36 receives the bleed flow 42 from a high pressure region 44. As such, the bleed flow 42 is at a much higher pressure than the ambient conditions. This difference in pressure may cause vibrations and sound within the bleed system 36. Further, the gas turbine system 10 undergoes thermal expansion as the system reaches its operating temperature. As such, the bleed system 36 includes various support structures to counteract the thermal expansion, vibrations, and sound. Further, the configuration of the bleed system 36 may result in a tensile load between approximately 200 and 600 pound-force, a shear load between approximately 200 and 600 pound-force, and a moment load between approximately 600 and 1400 inch-pound-force on components within the bleed system 36 (e.g., the engine connections and the valve 38).

Included in the present embodiment are multiple gimbals 52 and spring hangers 54. The gimbals 52 allow freedom of rotation in one or more axes and allow movement along one or more axes. This allows the pipes of the bleed system 36 to rotate and move relative to one another. Further, the gimbals 52 could include or be replaced by expansion joints or hoses. The spring hangers 54 allow the bleed system to move in a vertical direction 56. The present embodiment includes three gimbals 52 and two spring hangers 54 alternating along the flow path and all upstream of the valve 38. However, some embodiments may include any suitable number of gimbals 52 or spring hangers 54, including 1, 2, 3, 4, 5, 6 or more. Also, the gimbals 52 and spring hangers 54 may be disposed in various configurations, including gimbal-gimbal-spring hanger-gimbal-spring hanger, or any other configuration. Further, the gimbals 52, the spring hangers 54, or both reduce the forces (e.g., a load) exerted on the bleed system 36, the turbine 22, the exhaust section 24, or any combination thereof.

In the illustrated embodiments, the bleed system 36 also includes a fixed mount 60 downstream of the valve 38. The fixed mount 60 couples the bleed system 36 to another structure within the gas turbine system 10, such as a casing or housing. The present embodiment includes one fixed mount 60, but it should be appreciated that alternative embodiments may include more fixed mounts 60, including 2, 3, 4, 5, 6, or more fixed mounts 60. The bleed system 36 also includes a cover 62 disposed over the valve 38 and the fixed mount 60. In certain embodiments, the bleed system 36 is slideably coupled to the exhaust section 24 at the staged bleed conduit 40. This allows the staged bleed conduit 40 to move along a lateral axis 58 with respect to the exhaust section 24. Further, a portion of the staged bleed conduit 40 extends into the exhaust section 24.

A controller 55 (e.g., an electronic controller) coupled to the valve 38 may be configured to control the mass flow of the bleed flow 42 through the staged bleed conduit 40. The controller 55 includes memory and a processor. The memory may be a machine readable media configured to store code or instructions to be used by the processor to control the valve 38. Opening the valve 38 permits a greater bleed flow 42 to pass through the staged bleed conduit 40. The valve 38 may be fully closed to substantially block the bleed flow 42 from passing through the staged bleed conduit 40. Adjusting the valve 38 adjusts the bleed flow 42 as a portion of the main flow 48, so that opening the valve 38 increases the bleed flow 42 and decreases the main flow 48, and closing the valve 38 decreases the bleed flow 42 and increases the main flow 48. In some embodiments, the bleed flow 42 may be adjusted to be between approximately 0 percent to 15 percent, 1 percent to 10 percent, or 4 percent to 8 percent of the main flow 48. The valve 38 may be any type of valve, including, a butterfly valve, a gate valve, a globe valve, or a check valve.

The bleed flow 42 diverted from the main flow 48 of the high pressure region 44 is more pressurized than the environment of the low pressure region 46. The high pressure region 44 is at a first pressure, and the low pressure region 46 is at a lower, second pressure. The bleed flow 42 may rapidly flow from the inlet 50 at approximately the first pressure to the outlet section 53 at approximately the second pressure. The rapid flow of the bleed flow 42 as it depressurizes may generate vibration and noise within the bleed system 36 unless otherwise mitigated as described herein. For example, throttling the bleed flow 42 with the valve 38 may perturb the bleed flow 42 to induce vibration and noise through cavitation, backpressure waves, or other effects from the depressurization. Present embodiments of the bleed system 36 are configured to reduce vibrations and noise by depressurizing the bleed flow 42 in multiple stages (e.g., 2, 3, 4, 5, 6, 7, 8, 9, 10, or more stages). Reducing vibrations and noise may reduce fatigue, increase the life, and decrease maintenance of the bleed system 36, the high pressure region 44 (e.g., compressor 30), and/or the low pressure region 46 (e.g., exhaust section 24). Each stage of the bleed system 36 may be configured to depressurize the bleed flow 42 to reduce the vibration and noise. In some embodiments, the bleed system 36 is configured to reduce the vibration and noise from the depressurizing bleed flow 42 without substantially affecting the mass flow range of the bleed flow 42, which may be directed through the valve 38 by the controller 55. In some embodiments, each stage is configured to substantially match the expansion of the bleed flow 42 with perturbations inherent to the direction in which the control valve 38 opens to reduce the vibration and noise.

Figure 3:
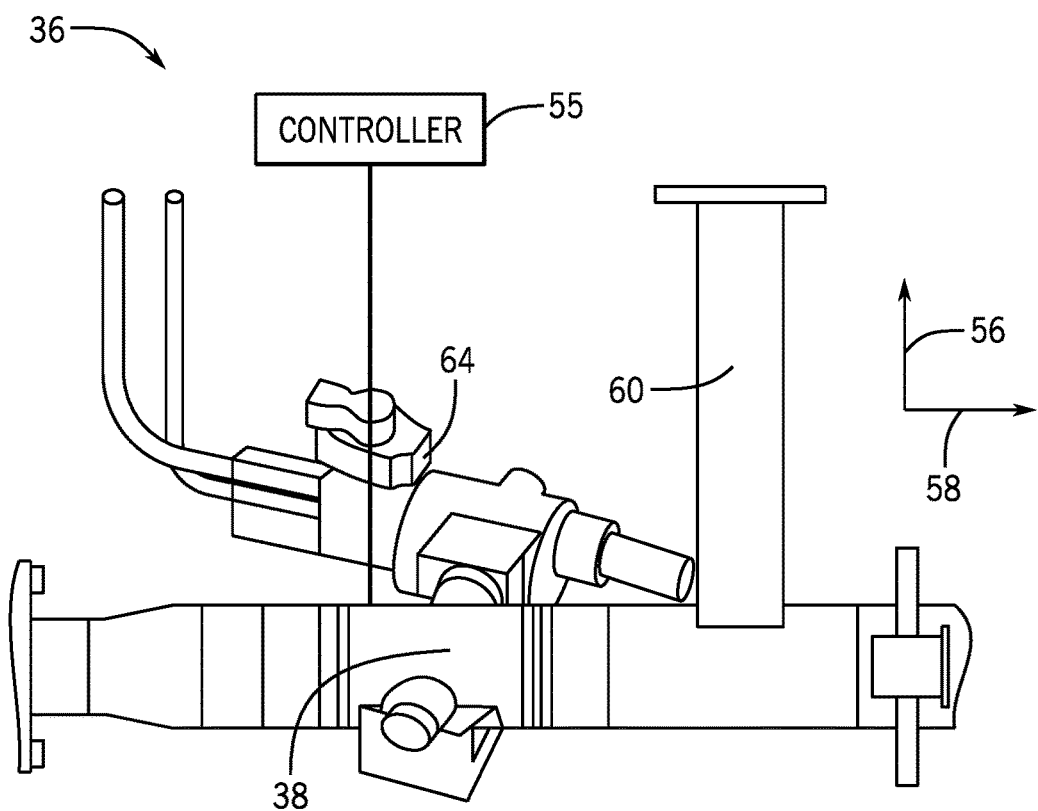
FIG. 3 is a side view detailing an embodiment of a valve and a fixed mount of the bleed system of FIG. 2.

FIG. 3 is a side view detailing an embodiment of the valve 38 and fixed mount 60. The fixed mount 60 is coupled (e.g., by a threaded fastener, such as a bolt, or by a weld) to the bleed system 36 downstream of the valve 38. The fixed mount 60 may extend in the vertical direction 56 and couples to another structure within the gas turbine system 10 (e.g., a casing). The fixed mount 60 is a bar that remains mostly rigid; however, in some embodiments, the fixed mount 60 may be any suitable structure, including a hollow member (e.g., a pipe), a lattice structure, or multiple bars, hollow members, or lattice structures. Coupled to the valve 38 is an actuator 64. The actuator 64 opens and closes the valve 38. Further, the actuator 64 may be hydraulic, pneumatic, or electric. The controller 55 may control the actuator 64 to open and close the valve 38 as described above.

Figure 4:
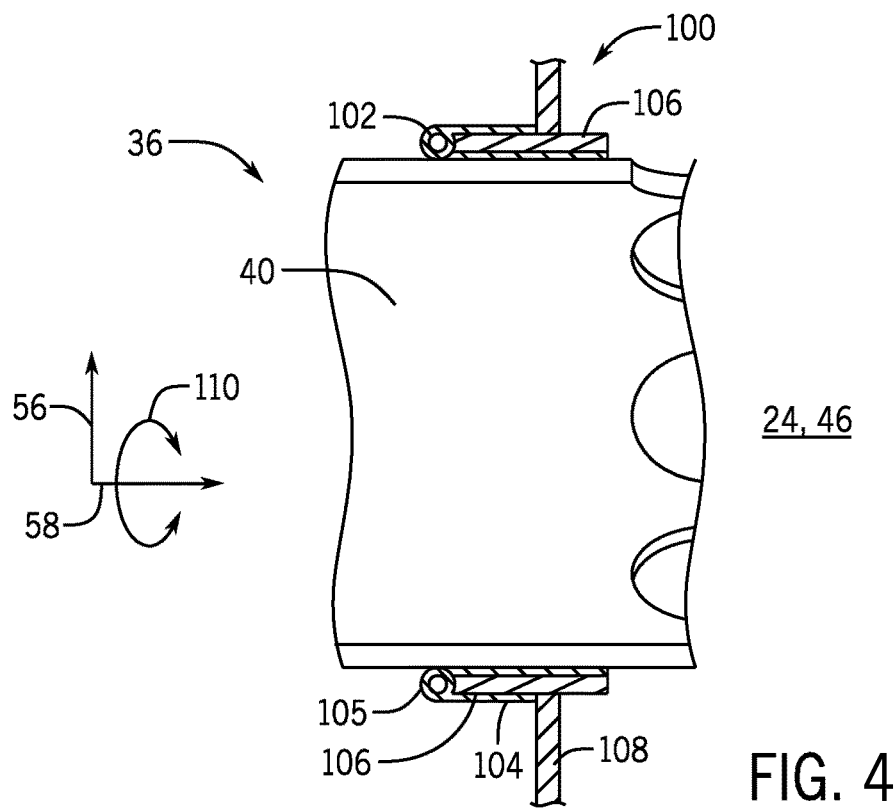
FIG. 4 is a cross-sectional side view of an embodiment of a staged bleed conduit of the bleed system of FIG. 2 slideably coupled to an exhaust section.

FIG. 4 is a cross-sectional side view of the staged bleed conduit 40 of the bleed system 36 slideably coupled to the exhaust section 24. A seal system 100 is utilized to slideably couple the bleed system 36 to the exhaust section 24. The seal system 100 may reduce the forces exerted by the bleed system 36 on the exhaust section 24. In the present embodiment, the seal system 100 includes a sealing element 102 (e.g., an annular seal), a seal support structure 104 (e.g., an annular clamp or annular structure), and an exhaust wall lip 106 (e.g., an annular lip). The exhaust wall lip 106 may be integral with a wall 108 of the exhaust section 24. Alternatively, the exhaust wall lip 106 may be a separate piece that is coupled (e.g., welded or bolted) to the wall 108. The wall 108 (e.g., a housing) extends and encloses to define the low pressure region 46. The exhaust wall lip 106 extends in a circumferential direction 110 to form an annular passage through which the staged bleed conduit 40 of the bleed system 36 extends.

As shown, the sealing element 102 is disposed on an upstream edge of the exhaust wall lip 106. However, the sealing element 102 may be disposed in various suitable locations, such as on a downstream edge of the exhaust wall lip 106, between the exhaust wall lip 106 and the staged bleed conduit 40, or, in embodiments that exclude an exhaust wall lip 106, the sealing element 102 may be disposed at an interface between the wall 108 of the exhaust section 24 and the staged bleed conduit 40. The depicted sealing element 102 is a tadpole seal, with a cross-section that includes a main body 105 that is approximately circular and an extension 106 that is a thin (i.e., thinner than the main body) extension from the main body 105. The sealing element 102 may be composed of any suitable material, including metallic, ceramics, fiberglass, elastomers, polymers, or any combination of materials. The sealing element 102 extends in the circumferential direction 110 around the interface of the exhaust wall lip 106 and the staged bleed conduit 40 and is held in place by the seal support structure 104. The seal support structure 104 extends in the circumferential direction 110 around the exhaust wall lip 106 and the extension 106 of the sealing element 102 and is tightened to hold the sealing element 102 in place. This configuration of the seal system 100 allows the staged bleed conduit 40 to move in the lateral direction 58, while, at the same time, the seal system 100 resists movement of the staged bleed conduit 40 in the vertical direction 56. In some embodiments, the wall 108 of the exhaust section 24 may contain an annular groove along the interface between the wall 108 and the staged bleed conduit 40 in which a sealing element 102 may be placed.

Figure 5:
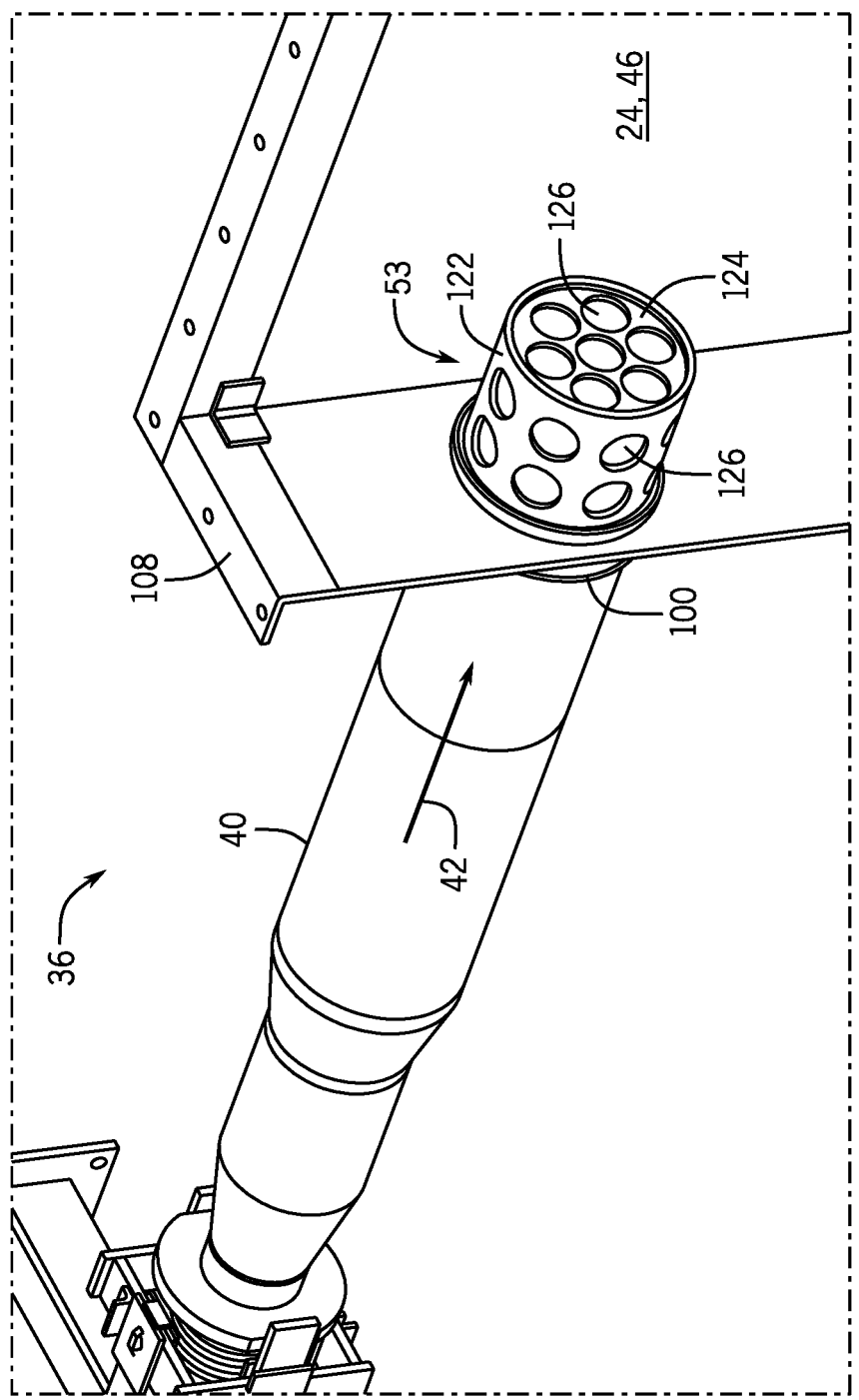
FIG. 5 is a perspective view of an embodiment of the staged bleed conduit of FIG. 4 extending through a wall of the exhaust section.
Figure 5:
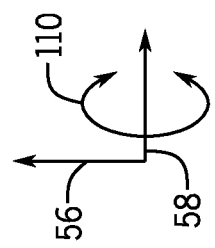

FIG. 5 is a perspective view of an embodiment of the staged bleed conduit 40 extending through the wall 108. As previously discussed, the staged bleed conduit 40 extends through the wall 108 to discharge the bleed flow 42 through the outlet section 53 and into the low pressure region 46. The outlet section 53 includes a sidewall 122 (e.g., an annular wall or surface), an endcap 124 (e.g., extending in a plane perpendicular to the flow of the bleed flow and a central axis of the stage bleed conduit 40), and openings 126. The openings 126 allow the bleed flow 42 to flow into the low pressure region 46. The openings 126 in the sidewall 122 are disposed in the circumferential direction 110 in the sidewall 122. As depicted, there are two rows of openings 126 at different locations along the lateral axis 58. The sidewall 122 may include more or fewer rows of opening 126, including 1, 2, 3, 4, 5, 6, or more rows of openings 126. FIG. 5 shows openings 126 as having the same or similar radii and being circular in shape; however, it should be appreciated that the openings 126 may have non-uniform radii, or may include a variety of shapes, including triangles, quadrilaterals, or any other shape. Some embodiments may utilize different patterns of opening 126 in the sidewall 122, including columns, alternating sizes or shapes, or utilize no pattern at all. By including openings 126 on the sidewall 122 and the endcap 124, the staged bleed conduit 40 may have a smaller diameter, while maintaining a flow rate of a conduit with a larger diameter. This may allow the staged bleed conduit 40 to be smaller and fit in a more compact space, for example.

Figure 6:
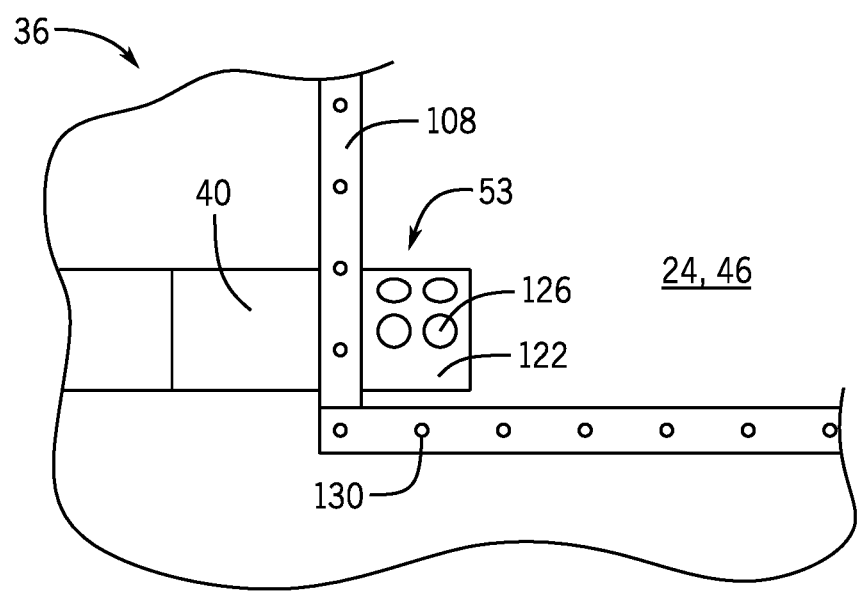
FIG. 6 is a top view detailing an embodiment of an outlet section of the staged bleed conduit of FIG. 4 disposed near a corner of the exhaust section.
Figure 6:
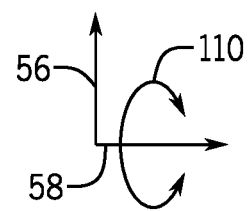

FIG. 6 is a top view detailing an embodiment of the outlet section 53 disposed near a corner of the exhaust outlet 24

(e.g., an intersection of walls 108). In some embodiments, the stage bleed conduit 40 may enter the exhaust outlet 24 near an edge 130 of the exhaust outlet 24. As such, the openings 126 may extend partially in the circumferential direction 110 along the sidewall 122 (e.g., equal to or less than about 25 percent, 50 percent, 60 percent, 75 percent, or 90 percent). Thus, a portion (e.g., a continuous portion equal to or greater than about 10 percent, 25 percent, 40 percent, 50 percent, or 75 percent) of the sidewall 122 is devoid of the openings 126. In other embodiments, the openings 126 may extend fully in the circumferential direction 110 along the sidewall 122.

Figure 7:
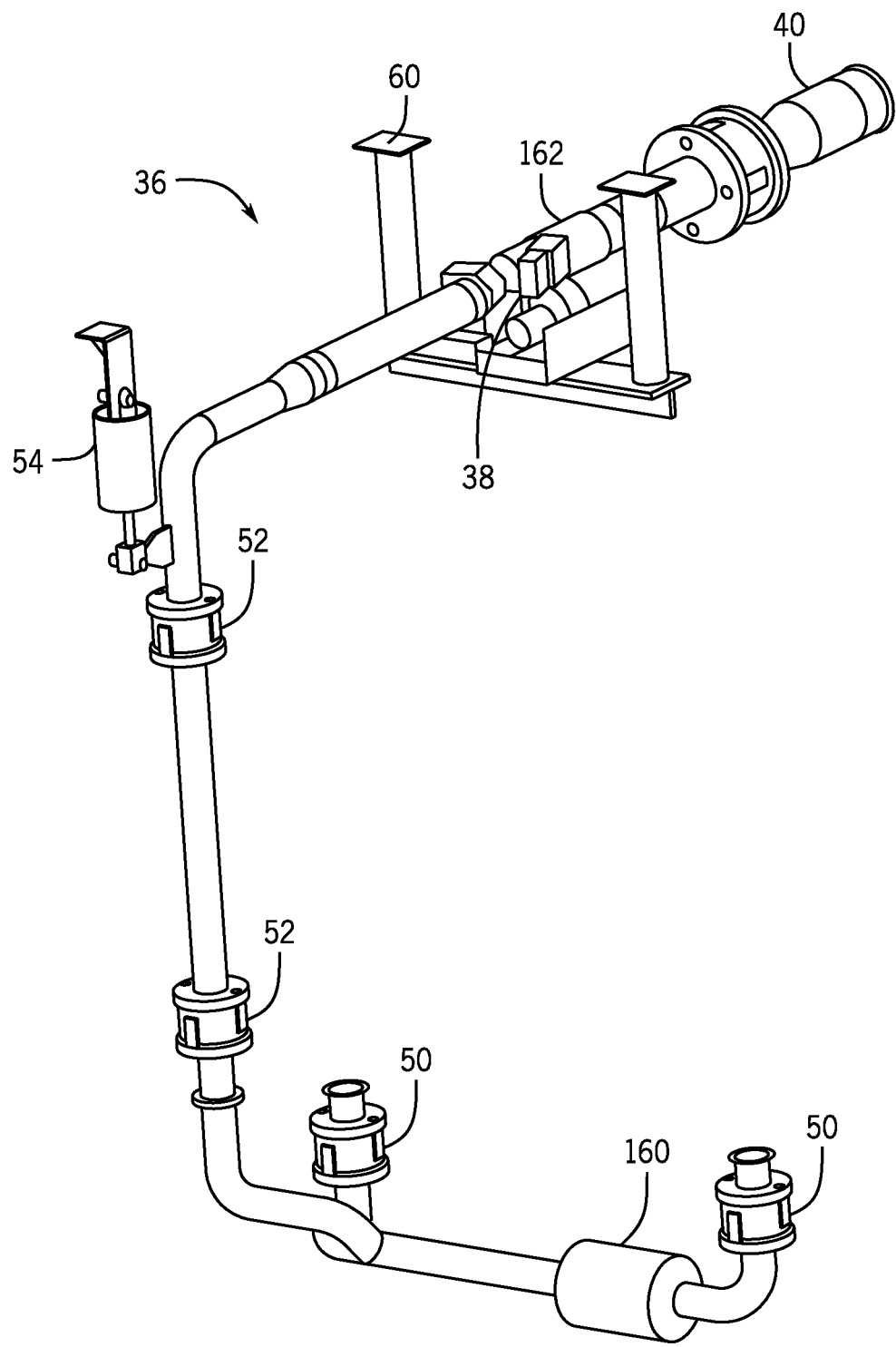
FIG. 7 is a perspective view of an embodiment of a bleed system that may be used in the gas turbine system of FIG. 1.

FIG. 7 is a perspective view of an embodiment of the bleed system 36. As depicted, the bleed system 36 includes two inlets 50. Downstream of one of the inlets 50 is an expansion joint 160. The expansion joint 160 may allow the piping on either side of the expansion joint 160 to move along a central axis of the piping relative to one another. The bleed system 36 also includes two gimbals 52 and one spring hangar 54, all upstream from the valve 38. The fixed mount 60 is included at approximately the same location as the valve 38. Further, the fixed mount 60 includes three members forming a U-shape. Downstream of the valve 38 is a second expansion joint 162 followed by the staged bleed conduit 40, which may include any of the features disclosed above with respect to FIGS. 1-6.

Figure 8:
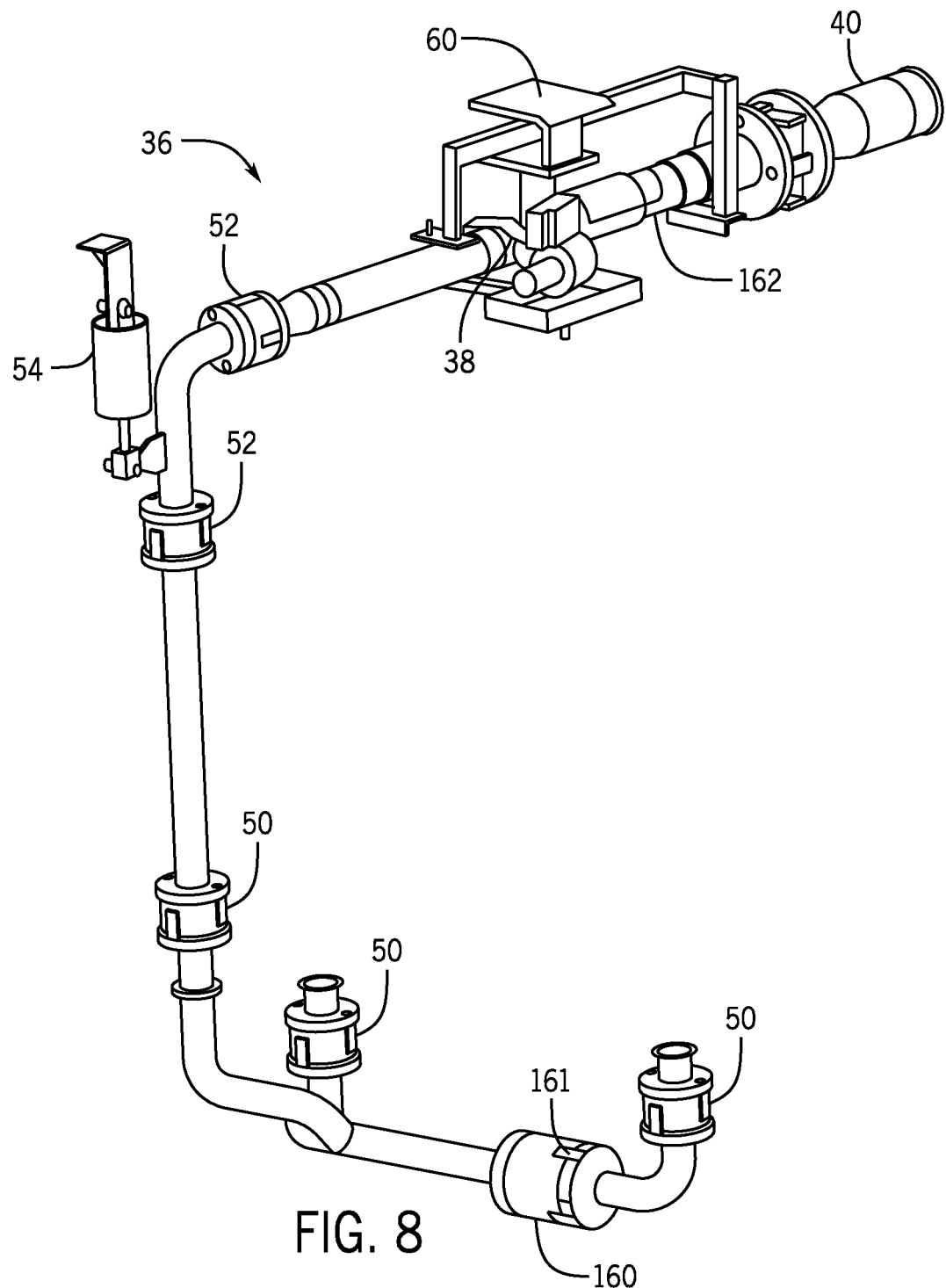
FIG. 8 is a perspective view of an embodiment of a bleed system that may be used in the gas turbine system of FIG. 1.

FIG. 8 is a perspective view of an embodiment of the bleed system 36. In FIG. 8 the expansion joint 160 includes two tie rods 161. The tie rods 161 may reduce movement in directions not along the central axis of the piping. The bleed system 36 includes a third gimbal 52 disposed between the spring hangar 54 and the valve 38, and the fixed mount 60 includes mounting points upstream and downstream of the valve 38. The mounting points of the fixed mount 60 are on opposing sides of the piping of the bleed system 36. The fixed mount 60 may be coupled to the bleed system 36, such as by fasteners, welds, bolts, tie rods, clamps, or hoses. It should be understood that any of the features shown or described with respect to FIGS. 1-8 may be combined in any suitable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a bleed system configured to direct a bleed flow from a high pressure region to a low pressure region, wherein the bleed system comprises:
a bleed conduit comprising an inlet coupled to the high pressure region and an outlet configured to provide the bleed flow into the low pressure region, wherein the outlet comprises one or more openings configured to enable the bleed flow to pass from the bleed conduit to the low pressure region, wherein the one or more openings comprise a first opening positioned on a sidewall of the bleed conduit and a second opening disposed on an end wall of the bleed conduit, wherein, during operation, the bleed conduit is slideably coupled to a housing that defines the low pressure region, such that the bleed conduit moves relative to the housing.

2. The system of claim 1, wherein the bleed system comprises a plurality of gimbals or hoses, wherein each of the plurality of gimbals and hoses is configured to enable movement along at least one axis during operation, thereby reducing a load at a gas turbine engine or a bleed control valve.

3. The system of claim 1, wherein the bleed system comprises at least one spring hanger, wherein the at least one spring hanger is configured to enable the bleed system to move along a vertical axis during operation.

4. The system of claim 1, wherein the one or more openings comprise a plurality of openings positioned asymmetrically relative to an axis of the bleed conduit.

5. The system of claim 4, wherein the plurality of openings are arranged in multiple rows at different locations along the axis of the bleed conduit.

6. The system of claim 1, wherein an annular seal is disposed at an interface between the bleed conduit and the housing, wherein the annular seal enables the bleed conduit to slide along a lateral axis with respect to the housing.

7. The system of claim 1, comprising:
the high pressure region, wherein the high pressure region comprises a compressor; and
a gas turbine coupled to the compressor.

8. A system, comprising:
a bleed system configured to direct a bleed flow from a high pressure region to a low pressure region, wherein the bleed system comprises:
a bleed conduit comprising an inlet coupled to the high pressure region and an outlet positioned within the low pressure region, wherein a portion of a sidewall of the bleed conduit that is positioned within the low pressure region comprises a plurality of openings configured to enable the bleed flow to pass from the bleed conduit into the low pressure region, wherein the plurality of openings is positioned asymmetrically relative to an axis of the bleed conduit.

9. The system of claim 8, wherein the bleed system comprises a plurality of gimbals, wherein each of the plurality of gimbals is configured to enable movement along at least one axis during operation.

10. The system of claim 9, wherein the plurality of openings are arranged in a plurality of rows at different locations along a lateral axis of the bleed conduit.

11. The system of claim 8, wherein the plurality of openings extend 75 percent or less of a circumference of the bleed conduit.

12. The system of claim 8, wherein one or more additional openings are formed within an endcap at the outlet of the bleed conduit.

13. A system, comprising:
a gas turbine engine comprising:
a compressor configured to produce a bleed flow;
a gas turbine coupled to the compressor;
an exhaust section configured to receive an exhaust flow and the bleed flow; and
a bleed system configured to direct the bleed flow from the compressor to the exhaust section, wherein the bleed system comprises:
a bleed conduit comprising an inlet coupled to the compressor and an outlet positioned within the exhaust section, wherein, during operation, the bleed conduit is slideably coupled to the exhaust section, such that the bleed conduit moves relative to the exhaust section; and a gimbal, a spring hanger, or a combination thereof, coupled to the bleed system, wherein the gimbal is configured to enable movement in a rotational direction, and the spring hanger is configured to enable movement in a vertical direction.

14. The system of claim 13, wherein the bleed conduit extends through an opening formed in a wall of the exhaust section.

15. The system of claim 14, wherein the wall supports an annular seal that is configured to seal against a sidewall of the bleed conduit as the bleed conduit slides along a lateral axis relative to the exhaust section.

16. The system of claim 15, wherein the bleed system comprises a seal support structure configured to hold the annular seal in place against the sidewall of the bleed conduit.

17. The system of claim 13, wherein the bleed system comprises the gimbal and the spring hanger.

18. The system of claim 13, wherein a portion of a sidewall of the bleed conduit that is positioned within the exhaust section comprises a plurality of openings configured to enable the bleed flow to pass from the bleed conduit into the exhaust section, wherein the plurality of openings is positioned asymmetrically relative to an axis of the bleed conduit.

19. A system, comprising:
a bleed system configured to direct a bleed flow from a high pressure region to a low pressure region, wherein the bleed system comprises:
a bleed conduit comprising an inlet coupled to the high pressure region and an outlet configured to provide the bleed flow into the low pressure region, wherein, during operation, the bleed conduit is slideably coupled to a housing that defines the low pressure region, such that the bleed conduit moves relative to the housing; and
a gimbal, a spring hanger, or a combination thereof, coupled to the bleed system, wherein the gimbal is configured to enable movement in a rotational direction, and the spring hanger is configured to enable movement in a vertical direction.

20. The system of claim 19, comprising the gimbal coupled to the bleed system.

21. The system of claim 19, comprising the spring hanger coupled to the bleed system.

22. The system of claim 19, comprising a turbomachine coupled to the bleed system.

* * * * *